United States Patent
Kim et al.

(10) Patent No.: US 8,725,995 B1
(45) Date of Patent: May 13, 2014

(54) SYSTEMS AND METHODS FOR UPDATING SYSTEM-LEVEL SERVICES WITHIN READ-ONLY SYSTEM IMAGES

(71) Applicant: Symantec Corporation, Mountain View, CA (US)

(72) Inventors: Sean Kim, Culver City, CA (US); Paul Sangster, Oceanside, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/070,894

(22) Filed: Nov. 4, 2013

(51) Int. Cl.
*G06F 9/00* (2006.01)
*G06F 15/177* (2006.01)
*H04L 9/32* (2006.01)
*G06F 11/30* (2006.01)
*G06F 9/44* (2006.01)
*G06F 9/445* (2006.01)

(52) U.S. Cl.
USPC ............... 713/1; 713/2; 713/176; 713/191; 709/222; 717/168; 717/174

(58) Field of Classification Search
USPC ........... 713/1, 2, 176, 191; 709/222; 717/168, 717/174
See application file for complete search history.

(56) References Cited

U.S. PATENT DOCUMENTS

| | | | | |
|---|---|---|---|---|
| 5,922,072 A | * | 7/1999 | Hutchinson et al. | 713/2 |
| 7,549,042 B2 | * | 6/2009 | Glaum et al. | 713/100 |
| 7,739,490 B2 | * | 6/2010 | Shiiba et al. | 713/2 |
| 7,836,444 B2 | * | 11/2010 | Kim | 717/173 |
| 7,877,809 B1 | * | 1/2011 | Sutton et al. | 726/24 |

OTHER PUBLICATIONS

Google, "Google Play", https://play.google.com/store?hl=en, as accessed Aug. 27, 2013, (Mar. 6, 2012).

* cited by examiner

*Primary Examiner* — Stefan Stoynov
(74) *Attorney, Agent, or Firm* — ALG Intellectual Property, LLC

(57) ABSTRACT

A computer-implemented method for updating system-level services within read-only system images may include (1) executing, during initialization of a mobile computing device, an update service stored within a read-only system image located on the mobile computing device, (2) identifying, via the update service, a writable partition located on the mobile computing device, (3) identifying, via the update service, a digitally signed update within the writable partition for at least one system-level service stored within the read-only system image, and (4) executing, via the update service, the digitally signed update within the writable partition instead of the system-level service stored within the read-only system image. Various other methods, systems, and computer-readable media are also disclosed.

20 Claims, 6 Drawing Sheets

SYSTEMS AND METHODS FOR UPDATING SYSTEM-LEVEL SERVICES WITHIN READ-ONLY SYSTEM IMAGES

BACKGROUND

Mobile device carriers and manufacturers often ship mobile computing devices with a read-only, factory-set system image. These system images generally include the settings, configurations, software, operating system, etc., needed to run and operate mobile computing devices. In some cases, device carriers and manufacturers may allow select developers (such as security software providers) to embed services in this image. While developers may update these services via carrier or manufacturer Over-The-Air (OTA) updates, this update process can be inconvenient and slow and may prevent developers from providing timely fixes to critical bugs. In addition, because OTA updates often involve re-flashing the device, this update process may represent an inherently risky undertaking, potentially resulting in failed updates that may render the device inoperable and/or cause critical applications on the device to fail. Finally, while developers can provide updates to remounted or "rooted" system images, this process may compromise device integrity and, in some cases, prevent the rooted device from connecting to carrier networks.

As such, the instant disclosure identifies and addresses a need for a more efficient and effective mechanism for updating system-level services within read-only system images.

SUMMARY

As will be described in greater detail below, the instant disclosure generally relates to systems and methods for updating a system-level service stored within a read-only system image by executing, from a writable partition, an update for the system-level service instead of the system-level service stored within the read-only system image. In one example, a computer-implemented method for accomplishing such a task may include (1) executing, during initialization of the mobile computing device, an update service stored within a read-only system image located on the mobile computing device, (2) identifying, via the update service, a writable partition located on the mobile computing device, (3) identifying, via the update service, a digitally signed update within the writable partition for at least one system-level service that is stored within the read-only system image and is configured to be loaded during initialization of the mobile computing device, and then (4) executing, via the update service, the digitally signed update within the writable partition instead of the system-level service stored within the read-only system image.

In some examples, the computer-implemented method may further include (1) retrieving the digitally signed update from a remote server and (2) storing the digitally signed update in a pre-defined location within the writable partition. In at least one embodiment, the method may also include (1) periodically searching the writable partition for updates and/or (2) periodically querying the remote server for updates.

The computer-implemented method may also include, prior to executing the digitally signed update, determining that the digitally signed update is secure by verifying a digital signature of the digitally signed update. In at least one example, verifying the digital signature of the digitally signed update may include verifying the authenticity and/or the integrity of the digitally signed update.

In some embodiments, the computer-implemented method may further include, upon identifying the digitally signed update for the system-level service, terminating the system-level service and executing the digitally signed update. In one example, executing the digitally signed update may include (1) immediately executing the digitally signed update and/or (2) executing the digitally signed update when the mobile computing device initializes.

In some examples of the computer-implemented method, the update service may include a parent process of the system-level service. In these examples, the computer-implemented method may further include, before identifying the digitally signed update for the system-level service, (1) identifying, via the update service, a digitally signed update within the writable partition for the update service, (2) verifying, via the update service, the digitally signed update for the update service, and then (3) executing, via the update service, the digitally signed update for the update service.

In one embodiment of the computer-implemented method, identifying the digitally signed update may include receiving, via the update service, notification of the digitally signed update from (1) the system-level service and/or (2) an additional service. The computer-implemented method may also include (1) identifying, via the update service, an update for at least one additional system-level service, (2) determining, via the update service, that the update for the additional system-level service is not secure because a digital signature of the update for the additional system-level service could not be verified, and (3) executing, via the update service, the additional system-level service instead of the update for the additional system-level service.

In one embodiment, the computer-implemented method may also include (1) detecting that the mobile computing device failed to initialize after the update service executed the digitally signed update and then (2) storing information about the failed initialization in a log within the writable partition. When the mobile computing device re-initializes, the method may further include (3) determining, based on information stored in the log, that the digitally signed update for the system-level service caused the failed initialization and (4) executing the system-level service stored within the read-only system image instead of the digitally signed update within the writable partition.

In one embodiment, a system for implementing the above-described method may include an initialization module that executes, during initialization of the mobile computing device, an update service stored within a read-only system image located on the mobile computing device. The update service may include a partition module that identifies a writable partition located on the mobile computing device. The update service may also include an identification module that identifies a digitally signed update within the writable partition for at least one system-level service that is stored within the read-only system image and that is configured to be loaded during initialization of the mobile computing device. The update service may further include an execution module that executes the digitally signed update within the writable partition instead of the system-level service stored within the read-only system image. The system may also include at least one physical processer configured to execute the initialization module and the various modules of the update service.

A corresponding computer-readable medium may include one or more computer-readable instructions that, when executed by at least one processor of a computing device, may cause the computing device to execute, during initialization of a mobile computing device, an update service stored within a read-only system image located on the mobile computing device. These computer-readable instructions may also cause the computing device to identify, via the update service, a writable partition located on the mobile computing device. These computer-readable instructions may further cause the computing device to identify, via the update service, a digitally signed update within the writable partition for at least one system-level service that is stored within the read-only system image and that is configured to be loaded during initialization of the mobile computing device. The computer-readable instructions may additionally cause the computing device to execute, via the update service, the digitally signed update within the writable partition instead of the system-level service stored within the read-only system image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
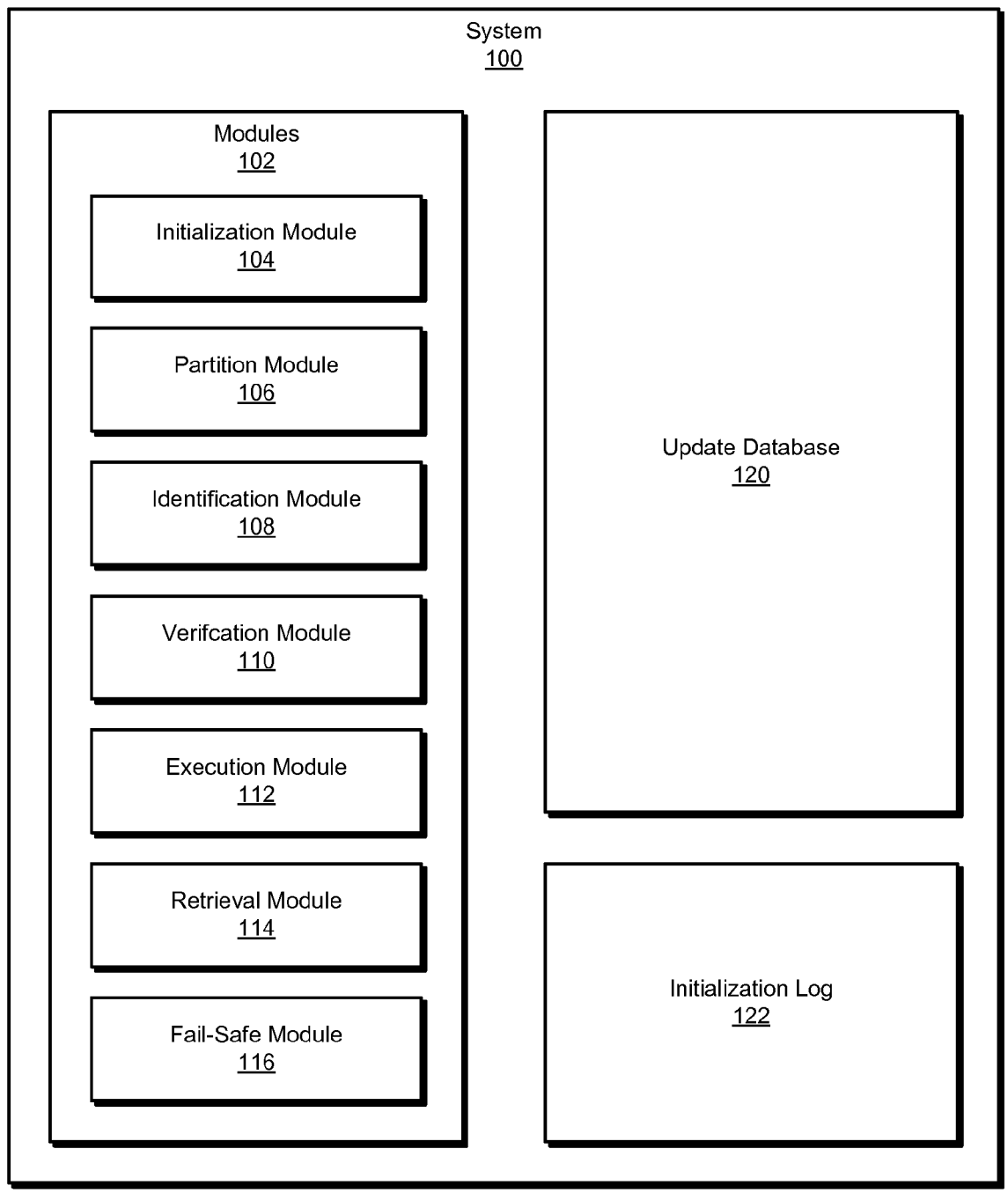
FIG. 1 is a block diagram of an exemplary system for updating system-level services within read-only system images.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for updating system-level services within read-only system images. As will be explained in greater detail below, the systems and methods described herein may provide an efficient and timely process for updating native executables stored within a read-only system image. Specifically, by storing updates for native executables within a writable partition and then executing these updates instead of the original native executables stored within the read-only system image, the systems and methods described herein may avoid risky update processes (such as OTA updates) and provide developers with a safe, easy-to-use process that can be performed without rooting, changing, or compromising the integrity of the read-only system image.

Figure 2:
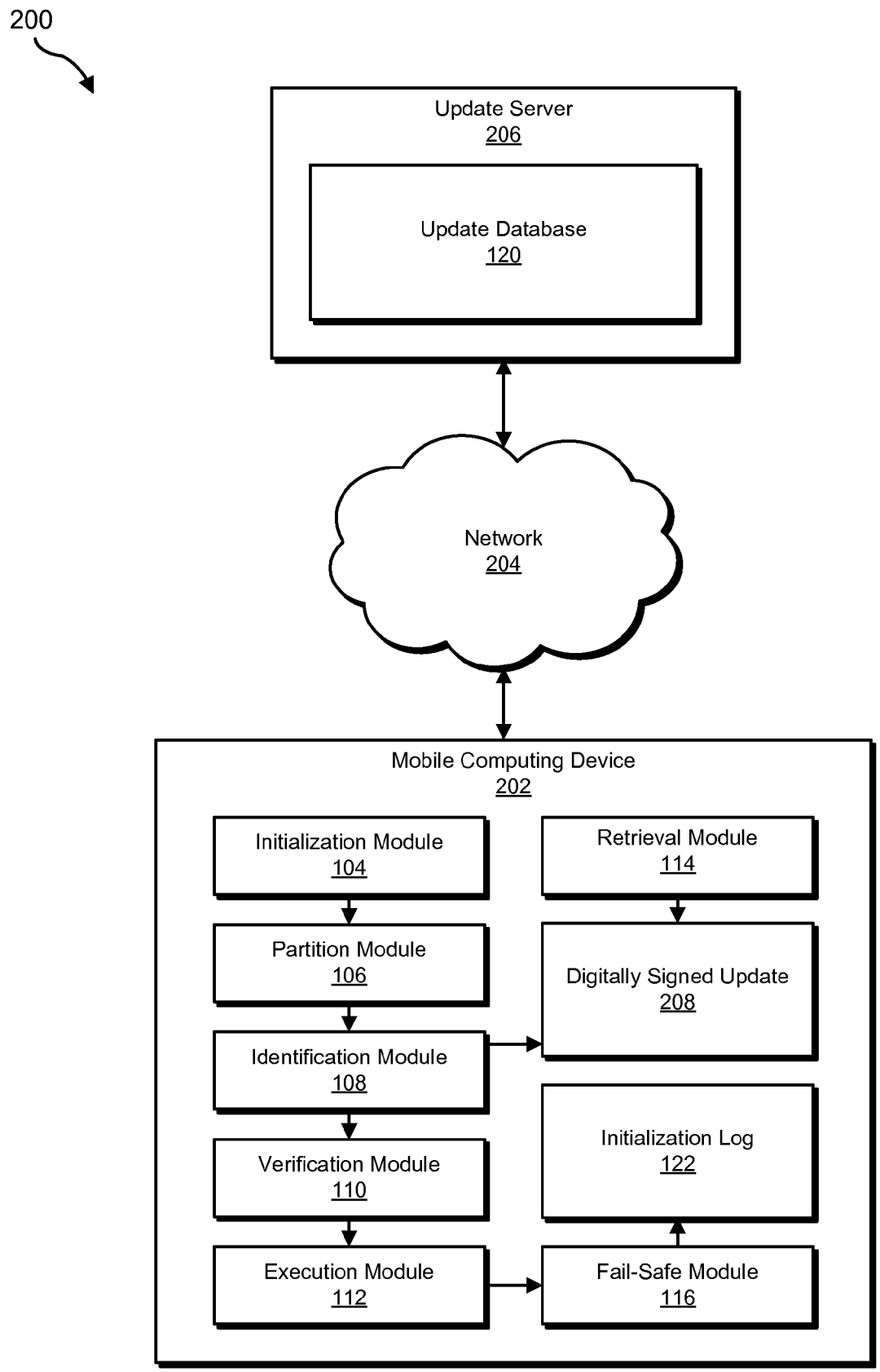
FIG. 2 is a block diagram of an exemplary mobile computing device capable of updating system-level services within read-only system images.

The following will provide, with reference to FIGS. 1-2, detailed descriptions of exemplary systems for updating system-level services within read-only system images. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for updating system-level services within read-only system images. As illustrated in this figure, exemplary system 100 may include one or more modules 102 for performing one or more tasks. For example, and as will be explained in greater detail below, exemplary system 100 may include an initialization module 104 that executes, during initialization of a mobile computing device, an update service stored within a read-only system image located on the mobile computing device. Exemplary system 100 may also include a partition module 106 that identifies a writable partition located on the mobile computing device. In addition, exemplary system 100 may include an identification module 108 that identifies a digitally signed update within the writable partition for at least one system-level service that is stored within the read-only system image and that is configured to be loaded during initialization of the mobile computing device. Exemplary system 100 may further include a verification module 110 that determines that the digitally signed update is secure by verifying a digital signature of the digitally signed update. Exemplary system 100 may also include an execution module 112 that executes the digitally signed update within the writable partition instead of the system-level service stored within the read-only system image.

In some embodiments, exemplary system 100 may also include a retrieval module 114 that retrieves the digitally signed update from a remote server and stores the same in a pre-defined location within the writable partition. Exemplary system 100 may further include a fail-safe module 116 that avoids executing digitally signed updates that prevent the mobile computing device from initializing. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., mobile computing device 202 and/or update server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as update database 120. In one example, update database 120 may be configured to store updates for system-level services that are stored within a read-only system image on a mobile computing device, such as mobile computing device 202 in FIG. 2. In at least one embodiment, update database 120 may represent a database stored on update server 206, and update server 206 may be configured to provide updates via network 204 to mobile computing device 202.

Update database 120 may represent portions of a single database or computing device or a plurality of databases or computing devices. For example, update database 120 may represent a portion of update server 206 in FIG. 2, computing system 510 in FIG. 5, and/or portions of exemplary network architecture 600 in FIG. 6. Alternatively, update database 120 in FIG. 1 may represent one or more physically separate devices capable of being accessed by a computing device, such as mobile computing device 202 and/or update server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a mobile computing device 202 in communication with an update server 206 via a network 204.

In one embodiment, one or more of modules 102 from FIG. 1 may, when executed by at least one processor of mobile computing device 202 and/or update server 206, facilitate mobile computing device 202 and/or update server 206 in updating system-level services within read-only system images. For example, and as will be described in greater detail below, initialization module 104 may cause mobile computing device 202 to execute, during initialization of mobile computing device 202, an update service stored within a read-only system image located on mobile computing device 202. Partition module 106 may then cause mobile computing device 202 to identify a writable partition located on mobile computing device 202. Identification module 108 may then cause mobile computing device 202 to identify a digitally signed update 208 within the writable partition located on mobile computing device 202. Verification module 110 may then cause mobile computing device 202 to determine that digitally signed update 208 is secure by verifying a digital signature of digitally signed update 208. Finally, execution module 112 may cause mobile computing device 202 to execute digitally signed update 208 within the writable partition instead of the system-level service stored within the read-only partition.

In one embodiment, retrieval module 114 may cause mobile computing device 202 to retrieve digitally signed update 208 from update server 206 and to store the same in a pre-defined location within the writable partition. In addition, fail-safe module 116 may cause mobile computing device 202 to avoid executing digitally signed updates that prevent mobile computing device 202 from initializing.

Mobile computing device 202 generally represents any type or form of computing device capable of reading computer-executable instructions. Examples of mobile computing device 202 include, without limitation, laptops, tablets, cellular phones, Personal Digital Assistants (PDAs), multimedia players, embedded systems, combinations of one or more of the same, exemplary computing system 510 in FIG. 5, or any other suitable computing device.

Update server 206 generally represents any type or form of computing device capable of storing and providing updates for system-level services, such as digitally signed update 208, to a mobile computing device. Examples of update server 206 include, without limitation, application servers and database servers configured to provide various database services and/or run certain software applications. In at least one example, update server 206 may provide digitally signed update 208 to mobile computing device 202 in response to a request for the same from mobile computing device 202. In another example, update server 206 may be configured to provide updates to mobile-computing device 202 on a periodic basis.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between mobile computing device 202 and update server 206.

Figure 3:
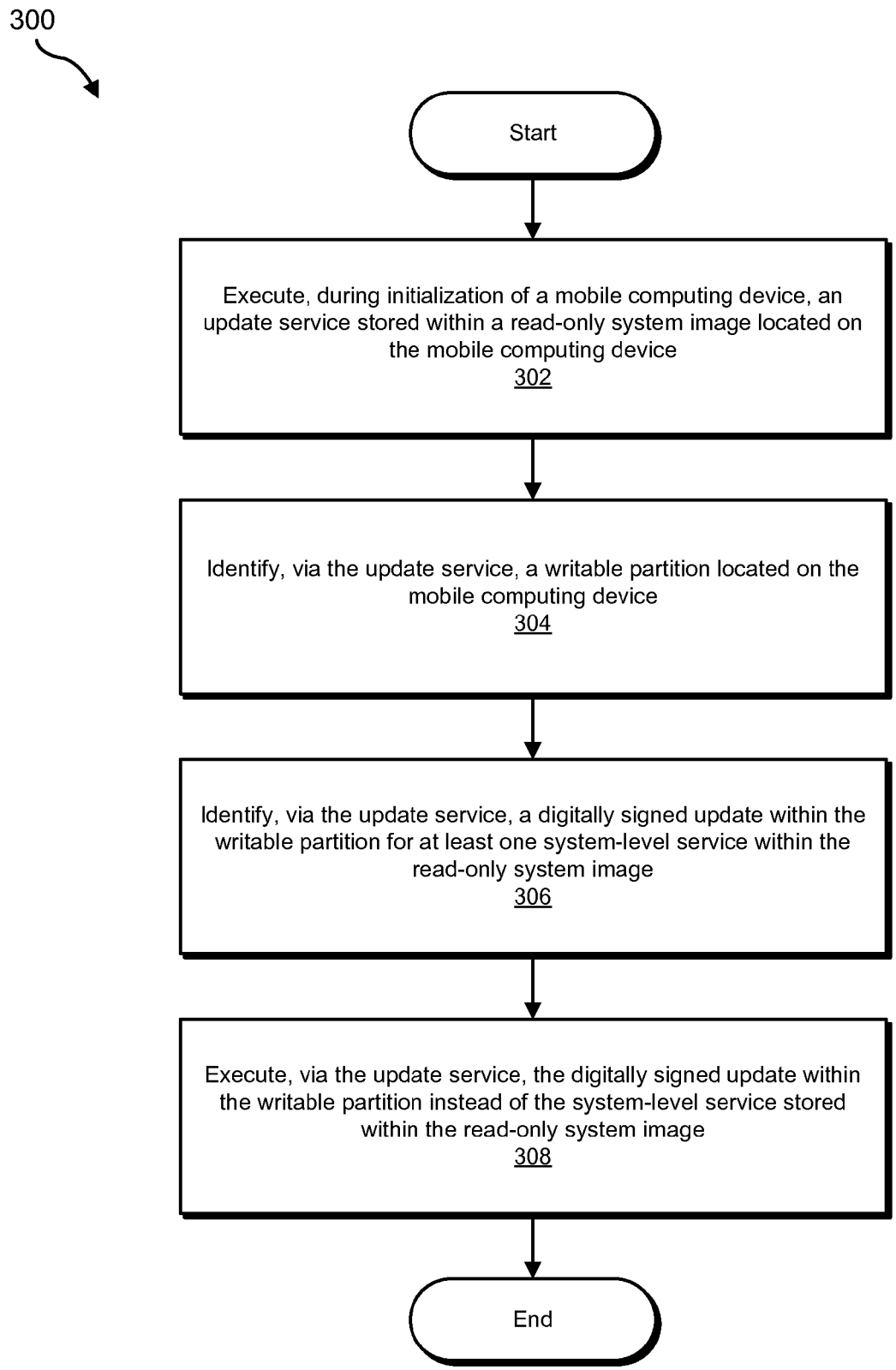
FIG. 3 is a flow diagram of an exemplary method for updating system-level services within read-only system images.

FIG. 3 is a flow diagram of an exemplary computer-implemented method 300 for updating system-level services within read-only system images. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, storage device 400 in FIG. 4, computing system 510 in FIG. 5, and/or portions of exemplary network architecture 600 in FIG. 6.

As illustrated in FIG. 3, at step 302 one or more of the systems described herein may execute, during initialization of a mobile computing device, an update service stored within a read-only system image located on the mobile computing device. For example, initialization module 104 may, as part of mobile computing device 202 in FIG. 2, execute, during initialization of mobile-computing device 202, an update service stored within a read-only system image located on mobile computing device 202.

As used herein, the term "initialization," when used with reference to mobile computing device 202, generally refers to any type or form of boot process performed by mobile computing device 202. For example, the term "initialization" may refer to any part of any process performed on mobile computing device 202 that is used to start and/or boot mobile computing device 202. The term "initialization" may also refer to any process or part of a process that readies and/or prepares mobile computing device 202 to run applications within an operating system.

In some examples, the term "initialization" may refer to a sequence of steps used to boot mobile computing device 202. Examples of such steps may include, without limitation and in any order, loading a "bootloader," performing any type of Power-On-Self-Test (POST), loading and executing a kernel and/or operating system, detecting hardware devices and loading device drivers, loading low-level Application Programming Interfaces (APIs) and system libraries, loading and executing low-level system services (e.g., the Zygote service on ANDROID devices), executing initialization processes and/or files (e.g., the "init" process and "init.rc" file for ANDROID devices), executing kernel daemons, mounting file systems, loading system services and/or core applications, and/or performing any other suitable step or combination of steps needed to initialize, configure, boot, and/or run mobile computing device 202.

The phrase "update service," as used herein, generally refers to any type of process capable of providing updates to system-level services stored on mobile computing device 202. In some examples, this update service may include one or more processes and/or steps executed on one or more computing devices, such as update server 206 and/or mobile computing device 202. This update service may also include any type or combination of files, libraries, code, systems, services, processes, etc., used to provide updates to mobile computing device 202. In at least one embodiment, this update service may include one or more steps or processes performed by one or more of modules 102, such as partition module 106, identification module 108, verification module 110, execution module 112, retrieval module 114, and/or fail-safe module 116.

As used herein, the phrase "read-only system-image" generally refers to any type of system image stored on a mobile computing device that is not writable. The phrase "read-only system image" may refer to a variety of system images in a variety of configurations, such as read-only system image 404 in FIG. 4. In some examples, the phrase "read-only system image" may refer to any type or form of system image stored on a read-only partition of mobile computing device 202 (e.g., the "/system" partition for ANDROID). In these examples, the read-only system image may be generally unwritable, un-modifiable, and/or un-configurable without "rooting" or remounting the image to a writable partition.

Read-only system images may contain files, processes, code, libraries, services, kernels, operating systems, etc., needed to boot, run, and/or generally use a mobile computing device. Read-only system images may also contain embedded system-level services that are provided by a third-party developer, such as a security software provider. In some examples, read-only system images may represent factory images that have been configured by a manufacturer or carrier of mobile computing device 202, and, as such, contain settings, software, services, drivers, etc., specific to that manufacturer or carrier. In some embodiments, read-only system images may be updated via OTA updates.

Figure 4:
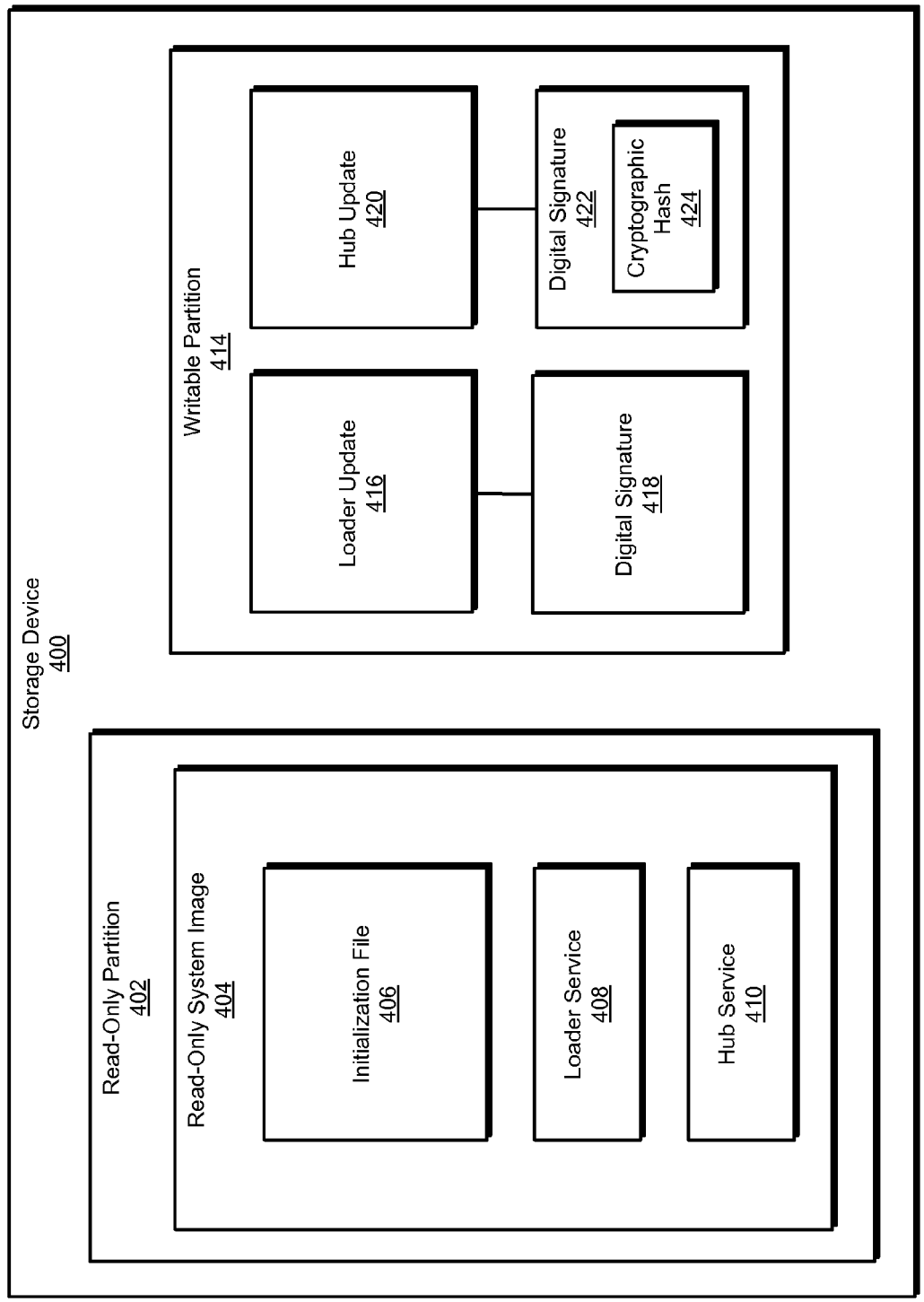
FIG. 4 is a block diagram of an exemplary multi-partition storage device used for updating system-level services within a read-only system image.

FIG. 4 illustrates an exemplary storage device 400 containing both a read-only partition 402 and a writable partition 414. In one example, storage device 400 may represent a storage device for a mobile device (e.g., an internal storage device within an ANDROID device), such as mobile computing device 202 and/or computing system 510. In this example, a read-only system image 404 within read-only partition 402 may contain an initialization file 406 that executes and/or loads system-level services (such as a loader service 408 and/or a hub service 410, as detailed below) during device initialization. As will be described in greater detail below, in some examples loader service 408 and/or hub service 410 may represent the recited "update service."

The systems described herein may perform step 302 in a variety of ways. In one example, the systems described herein may initialize the update service through an initialization process. For example, initialization module 104 may represent an initialization process (e.g., the "init" process for ANDROID) configured to execute and/or load system-level services during initialization and may execute the update service as part of that process. Specifically, initialization module 104 may represent an initialization process that parses an initialization file (e.g., initialization file 406 in FIG. 4) and executes entries found within the initialization file (e.g., entries for loader service 408 and/or hub service 410). For example, the update service may represent a service entry in an initialization file (e.g., init.rc for ANDROID). In this example, initialization module 104 may execute the update service by executing the process pointed to by the service entry.

In some embodiments, initialization module 104 may be executed from a read-only system image (e.g., read-only system image 404 within read-only partition 402 in FIG. 4), and may execute the update service from the same read-only system image. In other embodiments, initialization module 104 may execute the update service using any other process suitable for executing the update service during initialization of mobile computing device 202.

The systems described herein may execute the update service at any time during initialization of mobile computing device 202. For example, initialization module 104 may execute the update service at the beginning of an initialization process (e.g., immediately after a kernel has initialized), during the final steps of initialization (e.g., during the loading of high-level applications and services), or any other time during initialization of mobile computing device 202. In some embodiments, the update service may include one or more files, executables, computer-executable instructions, binaries, and/or libraries in any variety of configurations. In these embodiments, executing the update service may include executing one or more computer-executable instructions found within such configurations.

As illustrated in FIG. 3, at step 304 the systems described herein may identify, via the update service, a writable partition located on the mobile computing device. For example, partition module 106 may, as part of mobile computing device 202 in FIG. 2, identify a writable partition (e.g., writable partition 414 in FIG. 4) located on mobile computing device 202.

Within the instant disclosure, the phrase "writable partition" generally refers to any partition located on any type or form of computer-readable storage device that may be written to or modified. In some embodiments, the phrase "writable partitions" may refer to partitions that allow changes to files and/or directories. In certain examples, a variety of applications and services located on mobile computing device 202 may be capable of modifying the writable partition by saving files to the partition, installing programs, software, and/or updates to the partition, saving user settings and configurations on the partition, storing logs and other data on the partition, as well as performing any other action or process that modifies or changes the data on the writable partition. In some examples, the phrase "writable partition" may refer to a partition (e.g., the "/data" partition for ANDROID) that stores updates to services, files, libraries, applications, etc.

The systems and methods described herein may perform step 304 in a variety of ways. In one example, partition module 106 may search one or more storage devices on mobile computing device 202 for a writable partition. In another example, partition module 106 may search a pre-defined location on a storage device for a writable partition. In some embodiments, partition module 106 may identify a writable partition by examining partitions that were discovered by an initialization process of mobile computing device 202. For example, a boot process configured to mount file systems may discover multiple partitions during initialization of mobile computing device 202. In this example, partition module 106 may perform step 304 by accessing partition data discovered by the boot process.

As illustrated in FIG. 3, at step 306 the systems described herein may identify, via the update service, a digitally signed update within the writable partition for at least one system-level service within the read-only system image. For example, identification module 108 may, as part of mobile computing device 202 in FIG. 2, identify a digitally signed update 208 within the writable partition of mobile computing device 202 for a system-level service within the read-only system image of mobile computing device 202.

The phrase "digitally signed update," as used herein, generally refers to any type or form of update (e.g., loader update 416 and/or hub update 420 in FIG. 4) that has been signed using a digital signature (e.g., digital signature 418 and/or digital signature 422). Examples of such updates include, without limitation, system-level service updates, system-level library updates, system-level file and/or binary updates, system-level daemon updates, system-image updates, initialization process updates, initialization file updates, and/or any other suitable type or form of update. In addition, the term "digital signature," as used herein, generally refers to any type or form of scheme used to demonstrate the authenticity and/or integrity of a digital object. Digital signatures may be encrypted using a variety of encryption algorithms and schemes, such as RSA, DSA, ECDSA, ElGamal signature scheme, Schnorr signature, Pointcheval-Stern signature, Rabin signature, pairing based schemes such as BLS, undeniable signatures, aggregate signatures, and/or any other type or form of suitable algorithm and/or scheme. Examples of digital signatures may include, without limitation, signatures that verify the integrity of a digital object, signatures that verify the author of a digital object, signatures that verify both the integrity and the author of a digital object, and/or any other type or form of signature that may be used to demonstrate the security of a digital object in any way.

In some examples, the digitally signed update and the digital signature may be stored in the same file. Alternatively, the digital signature and the digitally signed update may be stored as separate files. For example, the digitally signed update and its corresponding digital signature may be stored as separate files in separate locations within the writable partition.

The phrase, "system-level service," as used herein, generally refers to any type of service native to mobile computing device 202. Examples of system-level services may include, without limitation, any type or form of native files, processes, binaries, computer-executable instructions, and/or any combinations of the same. "System-level services" may also refer to native services that are stored within a read-only system image. In one example, all or part of modules 102 may represent system-level services that are stored on the read-only system image of mobile computing device 202.

The phrase "system-level service" may also refer to any type of native service that is configured to be loaded during the initialization of a mobile computing device. Such services may include processes, files, libraries, API's, and/or computer-executable instructions that have been specifically designed and/or configured to be executed during initialization. For example, all or part of modules 102 may be specifically configured to be loaded during initialization of mobile computing device 202.

In some examples, the phrase "system-level service" may also refer to services or processes that must be executed in order for mobile computing device 202 to initialize and/or to services or processes that must be executed prior to the execution of higher-level applications and services. The phrase "system-level service" may also refer to services that need access to lower-level systems and services, and, as such, are configured to be loaded during initialization of mobile computing device 202. In some embodiments, the phrase "system-level service" may refer to daemons (i.e., background processes) configured to be executed during initialization of mobile computing device 202.

In some examples, system-level services may include a variety of native services specific to a mobile platform, such as the ANDROID platform (e.g., ANDROID 4.0). Examples of native ANDROID system-level services may include, without limitation, bootloaders, LINUX based kernels, kernel drivers (e.g., audio drivers, display drivers, usb drivers, etc.), the "init" process, the "init.rc" file, the Zygote process, the Dalvik Virtual Machine, ANDROID runtime core libraries, system libraries (e.g., SQLite, SGL, SSL, libc, OpenGL, etc.), and/or the application framework (e.g., window manager, activity manager, view system, XMPP service, package manager, etc.). Additionally, these ANDROID system-level services may be included in a variety of ANROID read-only system images (e.g., the "razor" factory images for nexus, such as ANDROID 4.3 JSS15Q and JSS15R).

In some examples, the phrase "system-level service" may refer to services within a framework of native services that are embedded in the read-only system image of mobile computing device 202 and are configured to be loaded when mobile computing device 202 initializes. For example, a security software developer may embed a framework of security services and tools (such as loader service 408 and hub service 410 in FIG. 4) in the read-only system image that, for security purposes, are configured to be executed when mobile computing device 202 initializes. In some embodiments, the read-only system image may include a variety of other frameworks, services, files, etc., provided by a variety of third-party developers.

The systems and methods herein may perform step 306 in a variety of ways. In one embodiment, the systems described herein may (1) retrieve, from a remote server, the digitally signed update and (2) store the digitally signed update in a pre-defined location within the writable partition. For example, retrieval module 114 may retrieve an update for loader service 408 in FIG. 4 (e.g., loader update 416) from update server 206 and store the same in writable partition 414. In this example, identification module 108 may identify loader update 416 by searching a pre-defined location within writable partition 414. In some examples, this pre-defined location may be a directory or folder within writable partition 414 into which retrieval module 114 stores loader update 416.

In some embodiments, the systems described herein may (1) periodically search the writable partition for updates and/or (2) periodically query the remote server for updates. For example, identification module 108 may periodically search the pre-defined location within the writable partition for updates. In some embodiments, identification module 108 may search the pre-defined location at a variety of intervals, such as once a day, once a week, once a month, multiple times a day, etc., or at any other suitable schedule or interval. Similarly, in some embodiments, retrieval module 114 may periodically query update server 206 for updates. For example, retrieval module 114 may query update server 206 at a variety of intervals, such as once a day, once a week, once a month, multiple times a day, etc., or at any other suitable schedule or interval.

In at least one embodiment, the systems described herein may identify the digitally signed update by receiving, via the update service, notification of the digitally signed update from (1) the system-level service and/or (2) an additional service. For example, identification module 108 may identify loader update 416 by receiving notification from loader service 408 and/or an additional service (e.g., hub service 410), such as a service or process that is configured to notify another software module (such as identification module 108) of updates. In some examples, the system-level service may be a parent process of the additional service (e.g., loader service 408 may represent a parent process of hub service 410). In other examples, the system-level service may be a child process of the additional service.

As illustrated in FIG. 3, at step 308 the systems described herein may execute, via the update service, the digitally signed update within the writable partition instead of the system-level service stored within the read-only system image. For example, execution module 112 may, as part of mobile computing device 202 in FIG. 2, execute digitally signed update 208 instead of the system-level service stored within the read-only system image.

The systems and methods described herein may perform step 308 in a variety of ways. For example, execution module 112 may execute digitally signed update 208 any time after identification module 108 identifies digitally signed update 208. In one embodiment, execution module 112 may immediately execute digitally signed update 208 after identification module 108 identifies the same. In another embodiment, execution module 112 may wait to execute digitally signed update 208 until the next time mobile computing device 202 initializes.

In some embodiments, the systems described herein may avoid executing digitally signed updates that prevent the mobile computing device from initializing. For example, the systems described herein may, after executing the digitally signed update as described in step 308, (1) detect that the mobile computing device failed to initialize and then (2) store information about the failed initialization in a log within the writable partition. When the mobile computing device re-initializes, the systems described herein may additionally (3) determine, based on information stored in the log, that the digitally signed update for the system-level service caused the failed initialization and may (4) execute the system-level service stored within the read-only system image instead of the digitally signed update within the writable partition. Specifically, fail-safe module 116 may detect that mobile computing device 202 failed to initialize after execution module 112 executed digitally signed update 208. Fail-safe module 116 may then store information about the failed initialization within initialization log 122. When mobile-computing device 202 re-initializes, fail-safe module 116 may determine, based on information stored in initialization log 122, that digitally signed update 208 caused the failed initialization. Fail-safe module 116 may then execute the system-level service instead of digitally signed update 208.

In various embodiments, the systems described herein may, prior to executing the digitally signed update, determine that the digitally signed update is secure by verifying a digital signature of the digitally signed update. For example, verification module 110 may determine that digitally signed update 208 is secure by verifying a digital signature of digitally signed update 208. Similarly, loader service 408 may determine that hub update 420 is secure by verifying digital signature 422.

The systems described herein may verify digital signatures (and, thus, their associated updates) in a variety of ways. In one example, the systems described herein may verify the authenticity of the digitally signed update by successfully decrypting the digital signature associated with the digitally signed update using a public cryptographic key provided by a publisher of the digitally signed update. For example, verification module 110 may verify the authenticity of loader update 416 in FIG. 4 by successfully decrypting its corresponding digital signature 418 using a public cryptographic key provided by the publisher of loader update 416.

In another example, the systems described herein may verify the integrity of the digitally signed update by verifying a cryptographic hash included within the digital signature associated with the digitally signed update. For example, verification module 110 may verify the integrity of hub update 420 in FIG. 4 by (1) calculating a cryptographic checksum or hash of hub update 420, (2) decrypting, using a public cryptographic key provided by a publisher of hub update 420, digital signature 422 to obtain a cryptographic hash 424, and then (3) determining that cryptographic hash 424 matches the calculated hash. Validating digital signature 422 in this manner may verify that hub update 420 has not been modified or tampered with since leaving the possession of its publisher.

In some embodiments of the systems described herein, the update service may be a parent process of the system-level service. For example, the update service may be part of a framework of services provided by a security software provider. In this example, loader service 408 may represent the recited update service, which may in turn load and monitor hub service 410. In some embodiments, hub service 410 may represent the recited system-level service, and in other embodiments, the system-level service may represent a child process of hub service 410.

In embodiments where the update service is a parent process of the system-level service, the systems described herein may, before identifying the digitally signed update for the system-level service, (1) identify, via the update service, a digitally signed update within the writable partition for the update service, (2) verify, via the update service, the digitally signed update for the update service, and (3) execute, via the update service, the digitally signed update for the update service. For example, loader service 408 may identify loader update 416, verify digital signature 418, and then execute loader update 416.

In various embodiments, the systems described herein may, upon identifying the digitally signed update for the system-level service, terminate the system-level service and execute the digitally signed update. For example, hub service 410 may identify hub update 420 and notify loader service 408 of the same. In response, loader service 408 may terminate hub service 410 and execute hub update 420 instead.

In some examples, hub service 410 may be a parent process of multiple child processes, including a live update service. In this example, the live update service may be configured to retrieve updates from update server 206 and store the same within writable partition 414. The live update service may also notify hub service 410 when an update for a child process of hub service 410 is downloaded. In this example, hub service 410 may then terminate the child process and then execute the update for the child process.

In some embodiments, the systems described herein may, after terminating the system-level service, either immediately execute the digitally signed update or execute the digitally signed update when the mobile computing device initializes. For example loader service 408 may, upon terminating hub service 410, immediately execute hub update 420. Alternatively, loader service 408 may, upon terminating hub service 410, wait until mobile computing device 202 re-initializes before executing hub update 420.

In some examples, the systems described herein may ensure system security by only executing verified updates. For example, the systems described herein may (1) identify, via the update service, an update for at least one additional system-level service that is configured to be loaded during initialization of the mobile computing device, (2) determine, via the update service, that the update for the additional system-level service is not secure because a digital signature of the update for the additional system-level service could not be verified, and then (3) execute, via the update service, the additional system-level service instead of the update for the additional system-level service. Specifically, hub service 410 may include a child process and may identify a digitally signed update for the same. Hub service 410 may then attempt to verify the digital signature of the update for the child process and may, for a variety of reasons, find that the digital signature of the child process could not be verified. For example, hub service 410 may find that a checksum or encrypted hash (similar to cryptographic hash 424) of the update for the child process is inconsistent and may determine, based on this inconsistency, that the update is unsecure because it has been altered from its original form. Hub service 410 may then execute the child process instead of the update for the child process.

In one example, the child process described in the previous paragraph may also be digitally signed, and a public key used to decrypt the digital signature of the child process may be included in read-only system image 404. In this example, hub service 410 may, before executing the child process, determine that the child process is secure by using the public key to verify the digital signature of the child process. By doing so, hub service 410 may verify that the child process is secure because it has not been modified. In various embodiments, read-only system image 404 may contain a variety of public keys and digital signatures used to verify the authenticity and integrity of read-only system image 404 and/or the system-level services stored within read-only system image 404. These public keys and digital signatures may help detect if read-only system image 404 has been modified (e.g., "rooted") in a way that compromises its security and/or integrity.

In some examples, the initialization process, loader service 408, and hub service 410 may represent daemons configured to run as background processes on mobile computing device 202. In these examples, these processes and services may perform the steps described within the instant disclosure at any time mobile computing device 202 is running. For example, after mobile computing device 202 initializes, hub service 410 may continue to monitor a framework of security services (all of which may be child processes of hub service 410). If an update for one of these security services is identified, hub service 410 may terminate itself and then be restarted by loader service 408.

In one embodiment, loader service 408 may be configured to restart hub service 410 a limited number of times, and, after reaching a pre-defined restart threshold number, may wait until mobile computing device 202 re-initializes before restarting hub service 410. In some embodiments, when hub service 410 identifies an update, hub service 410 may wait to restart until the next time mobile computing device 202 initializes.

The following will provide a detailed example of the process outlined above in connection with FIG. 3. In this example, during initialization of mobile computing device 202, an initialization process (e.g., the "init" process for ANDROID) may execute loader service 408 by parsing initialization file 406 and executing entries found within the same. Loader service 408, once executed, may then search for updates to itself within a pre-defined location on writable partition 414. If loader service 408 identifies an update, such as loader update 416, it may then attempt to verify the digital signature of the update. If verification of the update is successful, loader service 408 may execute the newest version of loader service 408, which, in this example, is loader update 416. If loader service 408 is unable to verify the update, then loader service 408 may refrain from executing the update.

After checking for its own updates, loader service 408 (or the updated version of loader service 408, as the case may be) may then check for updates for hub service 410 by searching a pre-defined location on writable partition 414. In this example, upon identifying hub update 420 by searching the pre-defined location, loader service 408 may determine that hub update 420 is secure by verifying cryptographic hash 424 and may execute hub update 420 instead of hub service 410. In other examples, if cryptographic hash 424 cannot be verified, loader service 408 may execute hub service 410 instead of hub update 420. Hub service 410 (or the updated version of hub service 410, as the case may be) may then check writable partition 414 for updates for one or more child processes. If updates are found for one or more of these child processes, hub service 410 may execute the updates for these child processes instead of the native versions of the same.

As explained above in connection with method 300 in FIG. 3, when mobile device developers want to provide updates to native binaries they have distributed within a read-only partition (e.g., the "/system" partition for ANDROID devices), they generally must wait until the device is flashed with a carrier or manufacturer OTA update. Developers may want an alternate solution to these often slow-to-release, risky OTA updates. One solution includes remounting or "rooting" the read-only system image, but doing so may compromise the integrity of the mobile device and, in some cases, prevent the device from connecting to a carrier network.

The instant disclosure may overcome these problems by executing, from a writable partition (e.g., the "/data" partition on ANDROID devices), updates for native binaries instead of the native binaries themselves. As detailed in the description above, this may be accomplished by retrieving a digitally signed update from a cloud server and installing the same in a pre-defined location on the writable partition. Before executing the digitally signed update, an update service may ensure that the update is secure by verifying the digital signature of the update. If the mobile device fails to boot after executing the update, information about the failed boot may be kept in a log within the writable partition so that problematic updates can be skipped in the future. By performing these steps, the instant disclosure may provide a secure solution for updating low-level services on a read-only partition without needing to re-flash the partition and/or the mobile device. In some examples, this solution may extend to include a "mother" process (e.g., the "init" process for ANDROID) that can provide updates for all system-level services and native binaries stored within the read-only partition. These solutions may, in turn, allow developers to provide timely updates to critical services, eliminate the risks inherent to flashing mobile devices with OTA updates, and increase sales by providing better supported and more robust services.

Figure 5:
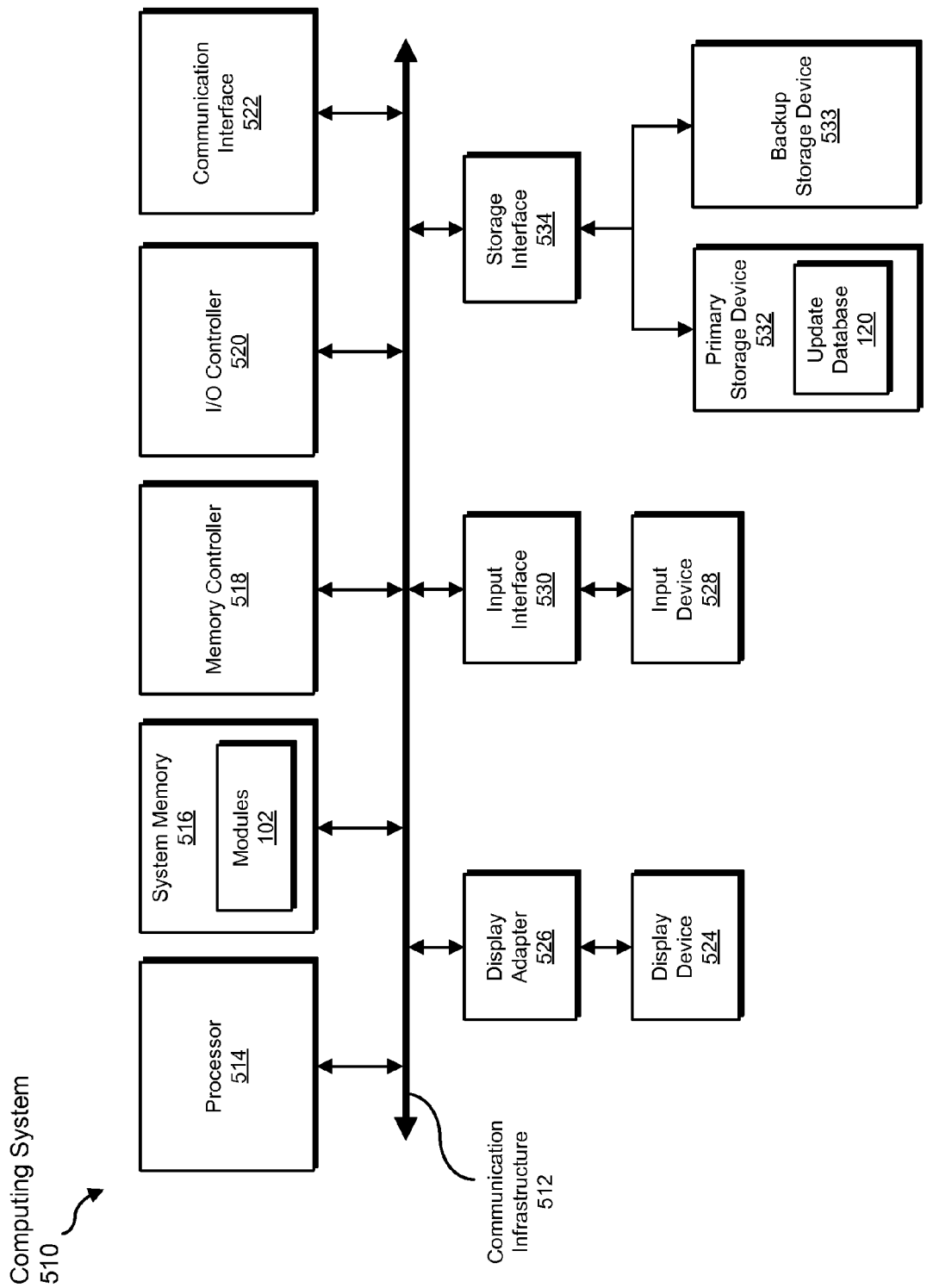
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, update database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
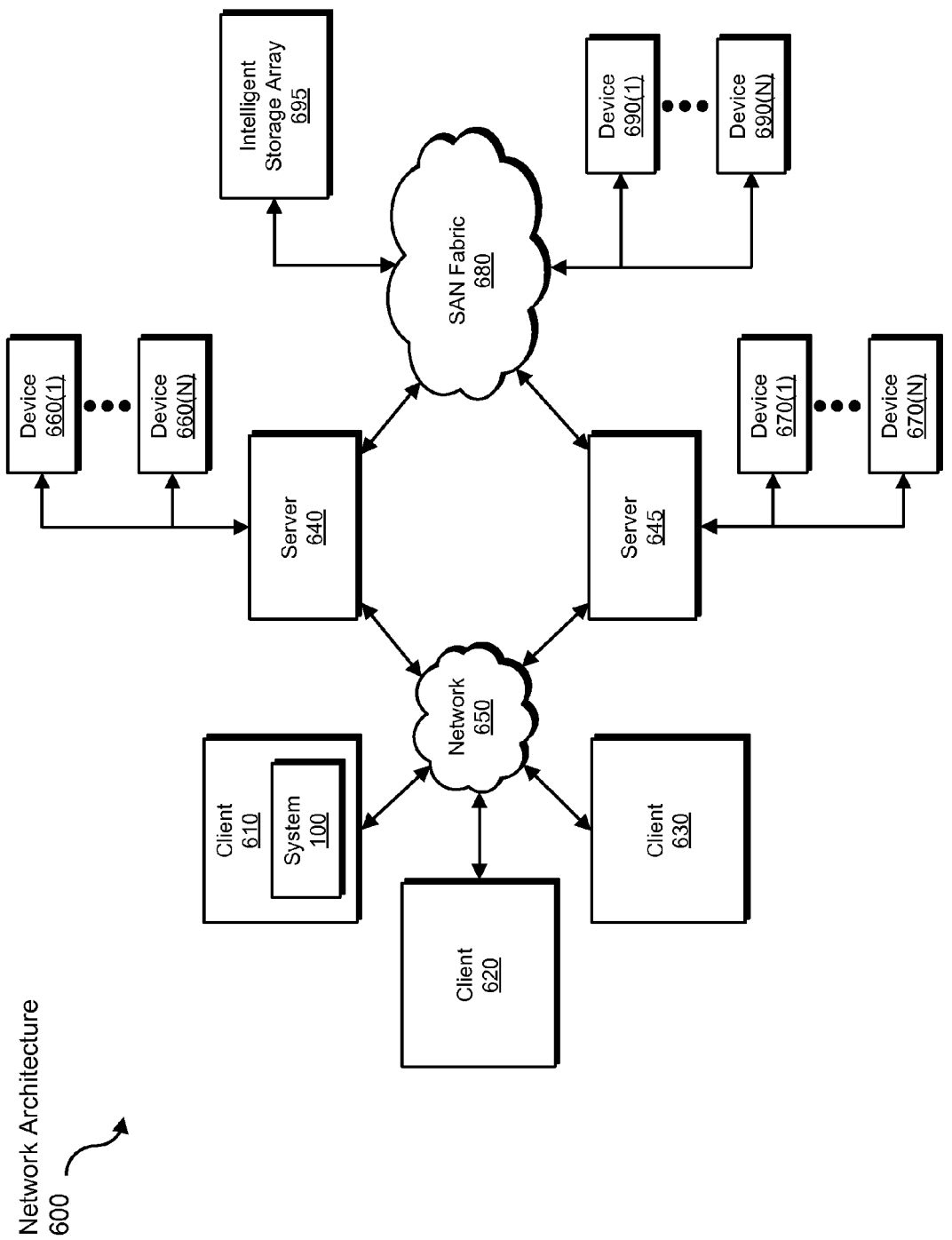
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for updating system-level services within read-only system images.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may identify a system-level service stored within a read-only system image and then transform the system-level service into an updated version of the same by executing a digitally signed update within a writable partition instead of the system-level service stored within the read-only system image. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for updating system-level services within read-only system images, at least a portion of the method being performed by a mobile computing device comprising at least one processor, the method comprising:
   executing, during initialization of the mobile computing device, an update service stored within a read-only system image located on the mobile computing device;
   identifying, via the update service, a writable partition located on the mobile computing device;
   identifying, via the update service, a digitally signed update within the writable partition for at least one system-level service stored within the read-only system image, wherein the system-level service is configured to be loaded during initialization of the mobile computing device;
   executing, via the update service, the digitally signed update within the writable partition instead of the system-level service stored within the read-only system image.

2. The computer-implemented method of claim 1, further comprising:
   retrieving, from a remote server, the digitally signed update;
   storing the digitally signed update in a pre-defined location within the writable partition.

3. The computer-implemented method of claim 2, further comprising at least one of:
   periodically searching the writable partition for updates;
   periodically querying the remote server for updates.

4. The computer-implemented method of claim 1, further comprising, prior to executing the digitally signed update, determining that the digitally signed update is secure by verifying a digital signature of the digitally signed update.

5. The computer-implemented method of claim 4, wherein verifying the digital signature of the digitally signed update comprises:
   verifying the authenticity of the digitally signed update;
   verifying the integrity of the digitally signed update.

6. The computer-implemented method of claim 1, further comprising, upon identifying the digitally signed update for the system-level service, terminating the system-level service and executing the digitally signed update.

7. The computer-implemented method of claim 6, wherein executing the digitally signed update comprises at least one of:
   immediately executing the digitally signed update;
   executing the digitally signed update when the mobile computing device initializes.

8. The computer-implemented method of claim 1, wherein the update service comprises a parent process of the system-level service.

9. The computer-implemented method of claim 8, further comprising, before identifying the digitally signed update for the system-level service:
   identifying, via the update service, a digitally signed update within the writable partition for the update service;
   verifying, via the update service, the digitally signed update for the update service;
   executing, via the update service, the digitally signed update for the update service.

10. The computer-implemented method of claim 1, wherein identifying the digitally signed update comprises receiving, via the update service, notification of the digitally signed update from at least one of:
   the system-level service;
   an additional service.

11. The computer-implemented method of claim 1, further comprising:
   identifying, via the update service, an update for at least one additional system-level service, wherein the additional system-level service is configured to be loaded during initialization of the mobile computing device;
   determining, via the update service, that the update for the additional system-level service is not secure because a digital signature of the update for the additional system-level service could not be verified;
   executing, via the update service, the additional system-level service instead of the update for the additional system-level service.

12. The computer-implemented method of claim 1, further comprising:
   detecting that the mobile computing device failed to initialize after the update service executed the digitally signed update;
   storing information about the failed initialization in a log within the writable partition;
   when the mobile computing device re-initializes, determining, based on the information stored in the log, that the digitally signed update for the system-level service caused the failed initialization;
   executing the system-level service stored within the read-only system image instead of the digitally signed update within the writable partition.

13. A system for updating system-level services within read-only system images, the system comprising:
   an initialization module, stored in memory, that executes, during initialization of the mobile computing device, an update service stored within a read-only system image located on the mobile computing device;
   a partition module, stored in memory, that identifies a writable partition located on the mobile computing device;
   an identification module, stored in memory, that identifies a digitally signed update within the writable partition for at least one system-level service stored within the read-only system image, wherein the system-level service is configured to be loaded during initialization of the mobile computing device;

an execution module, stored in memory, that executes the digitally signed update within the writable partition instead of the system-level service stored within the read-only system image;

at least one physical processor that executes the initialization module, the identification module, and the execution module;

wherein the update service comprises the partition module, the identification module, and the execution module.

14. The system of claim 13, further comprising a retrieval module, stored in memory, that:

retrieves, from a remote server, the digitally signed update;

stores the digitally signed update in a pre-defined location within the writable partition.

15. The system of claim 13, further comprising a verification module, stored in memory, that determines that the digitally signed update is secure by verifying a digital signature of the digitally signed update.

16. The system of claim 15, wherein the verification module verifies the digital signature of the digitally signed update by:

verifying the authenticity of the digitally signed update;

verifying the integrity of the digitally signed update.

17. The system of claim 15, wherein the update service executed by the initialization module comprises a parent process of the system-level service.

18. The system of claim 15, wherein:

the identification module identifies an update for at least one additional system-level service;

the verification module determines that the update for the additional system-level service is not secure because a digital signature of the update for the additional system-level service could not be verified;

the execution module executes the additional system-level service instead of the update for the additional system-level service.

19. The system of claim 15, further comprising a fail-safe module, stored in memory, that:

detects that the mobile computing device failed to initialize after the update service executed the digitally signed update;

stores information about the failed initialization in a log within the writable partition;

when the mobile computing device re-initializes, determines, based on the information stored in the log, that the digitally signed update for the system-level service caused the failed initialization;

executes the system-level service stored in the read-only system image instead of the digitally signed update within the writable partition.

20. A non-transitory computer-readable medium comprising one or more computer-executable instructions that, when executed by at least one processor of a computing device, cause the computing device to:

execute, during initialization of a mobile computing device, an update service stored within a read-only system image located on the mobile computing device;

identify, via the update service, a writable partition located on the mobile computing device;

identify, via the update service, a digitally signed update within the writable partition for at least one system-level service stored within the read-only system image, wherein the system-level service is configured to be loaded during initialization of the mobile computing device;

execute, via the update service, the digitally signed update within the writable partition instead of the system-level service stored within the read-only system image.

* * * * *